United States Patent [19]

Rostoker

[11] 3,793,039

[45] Feb. 19, 1974

[54] FOAMED GLASS BODY

[75] Inventor: David Rostoker, Corning, N.Y.

[73] Assignee: Corning Glass Works, Corning, N.Y.

[22] Filed: Aug. 2, 1972

[21] Appl. No.: 277,337

[52] U.S. Cl.................... 106/41, 106/40 N, 106/54
[51] Int. Cl.......................... C03c 3/08, C03c 11/00
[58] Field of Search...................... 106/40 R, 41, 54

[56] References Cited
UNITED STATES PATENTS

| 3,723,790 | 3/1973 | Dumbaugh et al. | 106/54 X |
| 3,661,601 | 5/1972 | Dumbaugh et al. | 106/54 |
| 2,485,724 | 10/1949 | Ford | 264/43 |
| 2,611,712 | 9/1952 | Ford | 106/40 V |
| 3,056,184 | 10/1962 | Blaha | 65/21 |
| 3,174,870 | 3/1965 | Connelly et al. | 106/40 R |
| 3,666,506 | 5/1972 | Cowan et al. | 106/41 |

*Primary Examiner*—A. B. Curtis
*Assistant Examiner*—Thomas A. Waltz
*Attorney, Agent, or Firm*—Clinton S. Janes, Jr.

[57] ABSTRACT

This invention relates to the production of low expansion, nondevitrifying alkali metal aluminoborosilicate glass foam bodies at temperatures not exceeding about 1,000°C. (1,832°F.).

10 Claims, No Drawings

FOAMED GLASS BODY

The utility of foam glass as a thermal insulating material is well known in the art. Thus, blocks of foamed glass have the advantages of being waterproof, vermin proof, rot proof, and incombustible, as well as being thermally insulating. However, several disadvantages of such products are also well recognized. For example, the cost of production is generally high, the thermal shock resistance is only fair at best, the maximum use temperature is commonly no higher than about 550°C., and the strength of the body is relatively low.

The manufacturing cost disadvantage normally suffered by foamed glass articles is the result of their being customarily produced from premelted glass. Hence, batch materials must be melted to yield a glass of a desired composition. The glass so formed is then cominuted, mixed with gas producing agents, heated to a temperature where the gas producing agent will react (frequently 800°–900°C.), and the body annealed. Thus, the normal glass foam involves the expensive step of batch melting with the necessary forming equipment.

Direct foaming of the base material would obviously yield a very practical economic advantage. U.S. Pat. Nos. 2,485,724; 2,611,712; 3,056,184; and 3,174,870 illustrate the direct foaming of natural minerals or unmelted glass batch utilizing a foaming or cellulating agent, thereby avoiding the need for a batch melting step. Nevertheless, these processes have not seen widespread use, except in the manufacture of small pellets, since adequate and uniform foaming of unmelted glass batch has been extremely difficult to secure. Hence, segregation in the batch and/or reactions within the batch can occur during the foaming which result in an inhomogeneous final product. It has also been proposed to fire natural materials and so circumvent those problems. However, such materials commonly require cellulating temperatures of up to 200°–500°C. higher. At those firing temperatures, the carbon-containing reducing agents conventionally utilized to foam premelted glass are not operable.

U.S. Pat. No. 3,666,506 disclosed adding fluxes to certain naturally-occurring minerals which then provided foaming temperatures and viscosities approximating the commercial premelted glasses but at temperatures below about 950°C. That patent describes a three-component batch: (1) a base material of clay and/or volcanic ash; (2) a flux; and (3) a carbon-containing cellulating agent. The manufacturing process comprises four steps: First, the batch ingredients are finely comminuted and carefully blended together; Second, the batch is shaped to a desired configuration; Third, the shape is fired without the need for a restraining mold to a temperature of about 800°–950°C.; and Fourth, the fired body is annealed to room temperature.

The composition of the glassy phase consists essentially, by weight, of 50–80 percent $SiO_2$, 10–25 percent $Al_2O_3$, 10–20 percent $R_2O$, wherein $Na_2O$ constitutes at least 60 percent of the $R_2O$, 0–10 percent impurities, and with a $SiO_2: Al_2O_3$ ratio between about 3:1–7:1. The glassy phase contains such crystals as alpha-quartz, cristobalite, and plagioclase feldspar. The densities of the fired bodies vary between about 0.15–0.65 gram/cc. and the coefficient of thermal expansion ranges between about 65–95 $x$ $10^{-7}/°C$.

Although such articles comprised a substantial improvement over foamed glasses in the prior art, particualrly with respect to the ability to foam from naturally-occurring materials at relatively low firing temperatures, the coefficient of thermal expansion thereof was high, thereby encumbering such products with rather poor thermal shock resistance. One important factor tending toward a high coefficient of thermal expansion was the presence of crystals therein (cristobalite, feldspar, etc.) resulting from devitrification of the glass.

There has been a real need for structural material that can be inexpensively foamed into articles of thick cross-section and of low density which exhibit good resistance to thermal shock such as to be suitable for fire walls and insulation for pipe coverings. The bodies produced throuth the practice recited in U.S. Pat. No. 3,666,506, supra, can satisfy each of the above desiderata except for resistance to thermal shock.

Therefore, the primary objective of the present invention is to provide inexpensive, lightweight articles of foamed glass which will be essentially free from devitrification and demonstrate good resistance to thermal shock, i.e., will exhibit a coefficient of thermal expansion less than $50 \times 10^{-7}/°C$.

I have discovered that such products can be made employing the basic method steps set out in U.S. Pat. No. 3,666,506, supra, but wherein the starting materials are different therefrom and are closely controlled within narrow composition limits. Thus, the base material consists of rock selected from the group finely-divided clay, volcanic ash, weathered volcanic ash, and mixtures thereof and comprising at least 50 percent by weight of the total batch. Essentially all of the batch particles will pass a standard United States 200 mesh screen with at least 10 percent thereof being finer than 5 microns in diameter. The cellulating agent comprises about 0.1–2 percent carbon and is selected from the group consisting of carbon, an inorganic compound which thermally decomposes below the cellulating temperature to yield carbon, and mixtures thereof. The flux comprises about 3–10 percent alkali metal oxide ($R_2O$) wherein $K_2O$ constitutes at least 60 percent by weight of the total. $K_2O$ rather than $Na_2O$ is used as the flux to assist in maintaining the coefficient of thermal expansion at a low level and to stabilize the glass against devitrification. A $B_2O_3$-containing material is included in amount to yield $B_2O_3$ contents ranging between about 7–18 percent by weight. The combination of base material, cellulating agent, flux, and $B_2O_3$ constitutes at least 75 percent by weight of the anhydrous batch with up to 25 percent of the batch being added silica, alumina, and/or grog. Grog is waste fired material that has been finely ground. The principal batch constituents are silica, alumina, alkali metal oxide, and boric oxide. These are present in weight percent as calculated from the batch in approximately the following amounts: 50–80 percent $SiO_2$, 10–20 percent $Al_2O_3$, 3–10 percent $R_2O$, and 7–18 percent $B_2O_3$ with the $SiO_2:Al_2O_3$ ratio ranging between about 3:1–7:1. The total of all impurities should not exceed about 10 percent by weight.

Where the $SiO_2$ content exceeds about 80 percent, the batch becomes too viscous to permit proper cellulating. When the $Al_2O_3$ content becomes too high, the liquidus is at too high a temperature to allow the desired foaming. If the amount of $R_2O$ exceeds about 10 percent, the batch becomes too fluid for appropriate cellulating. At least 7 percent $B_2O_3$ must be present to prevent devitrification and secure a low coefficient of thermal expansion. Where the $SiO_2$ and $Al_2O_3$ contents are below the specified minimum of each, the batch becomes too fluid for proper foaming. Too low a content of $R_2O$ produces a very viscous melt. The same latter effect is observed with $B_2O_3$ contents greater than about 18 percent.

The batch ingredients can be delineated on two bases: (1) on the oxide basis as calculated from the batch; and (2) on the anhydrous basis which refers to the raw batch materials exclusive of water. However, a clay may contain up to 15 percent absorbed water in addition to any water of hydration. That water which is removed from clay through heating to about 110°–150°C. is considered to be adsorbed water whereas temperatures of 500°–700°C. are required to eliminate water of hydration.

Similarly to U.S. Pat. No. 3,666,506, supra, clays containing substantial quantities of illite and/or smectite minerals are especially desirable for foaming. In particular, clay of the smectite group containing beidellite, nontronite, and/or montmorillonite exhibit excellent cellulating behavior with montmorillonite clays being the most preferred. The smectite group minerals are preferred since the $SiO_2:Al_2O_3$ ratio therein is high and the structure thereof can readily absorb operable organic celluating agents. If a clay is employed wherein the $SiO_2:Al_2O_3$ ratio does not fall within 3:1 to 7:1, finely-divided $SiO_2$ or $Al_2O_3$ will be added to secure the required ratio.

Bentonite clays, which are the result of the weathering of volcanic ash, comprise a preferred embodiment of the invention. Montmorillonite is the primary clay mineral therein and the grain size thereof is normally uniformly finer than 5 microns in diameter.

Whereas U.S. Pat. No. 3,666,506, supra, emphasizes the utility of $Na_2O$-containing flux materials, the presence thereof in the foamed glass raises the coefficient of thermal expansion and increases the probability of glass devitrification. Therefore, $K_2O$-containing materials are to be preferred with minor amounts of $Li_2O$ and/or $Na_2O$ flux materials being tolerated. Commonly, KOH will constitute the flux although other compounds of potassium such as $K_2CO_3$ and $K_2SiO_2$ can be substituted in whole or in part therefor. Inasmuch as the $B_2O_3$ included in the batch also appears to behave as a flux during melting, the total alkali metal oxide oxide content can be held at a lower level than in U.S. Pat. No. 3,666,506, supra.

The cellulating agents described in U.S. Pat. No. 3,666,506, supra, are equally operable in the instant invention. However, the use of potassium analogs instead of the recited sodium-containing fluxes will lead to lower coefficients of thermal expansion in the final product and insure stability against devitrification.

The $B_2O_3$ is commonly added as anhydrous $B_2O_3$ although less expensive borate compounds can be employed. It would be highly desirable economically to utilize borax as a batch material, but such is a $Na_2O$-containing compound with the consequent action of raising the coefficient of thermal expansion and hazarding glass instability. Therefore, only a small amount thereof can be safely tolerated.

In carrying out the invention, the batch ingredients are thoroughly blended together, normally in a ball mill to insure proper mixing and sizing. In general, the smaller the particle size the more homogeneous will be the final product. However, there are apparatus limitations which restrict the minimum particle size that can be practically obtained. Most frequently, the batch will be pressed in a conventional ceramic press to form a tile or other simple shape for subsequent firing. Nevertheless, where desired, a continuous slab can be readily produced by depositing the batch on a belt which passes within a firing chamber.

Where complicated shapes are to be pressed, it may be necessary to first form the batch into granules. This practice involves compacting the mixed batch by passing it through rollers and thereafter granulating it to provide a more workable batch material. The granules should be of such size as to pass through a 14 mesh United States Standard Sieve screen but rest upon a 100 mesh screen. The granulated batch will usually be moistened with a fine water spray. The amount of added water can be up to about 7 percent by weight of the batch. The water is primarily added to lend green strength to the body after it has been pressed. With still larger additions of water, e.g., up to a total of about 15 percent by weight, the batch can be extruded, pelletized, or otherwise shaped to configurations not attainable through pressing.

Inasmuch as the batch is commonly preformed to the desired configuration and expands to accommodate the expansion of the gas in the body, the body is frequently fired without restraint. Hence, large tile-like articles can be supported during the firing step on a heat resistant perforate metal sheet, such as stainless steel, which is capable of withstanding temperatures up to 950°C. and which has been coated with a material which permits the articles to expand without sticking thereto. Thin glass-ceramic sheets characterized by a low coefficient of thermal expansion, e.g., 0.060–0.300 inch thick, have also been found satisfactory. The thinness of the sheet enables uniform heat transference therethrough.

Where a continuous slab is desired, the batch can be deposited upon thin asbestos paper overlying a lehr belt which may be perforated with very fine holes to permit the escape of gas but not so large as to allow the batch to slip through.

The firing schedule contemplates heating the body to the cellulating temperature, normally about 875°–1,000°C. (1,607°–1,832°F.), and holding thereat for a sufficient length of time to attain minimum density. Thereafter, the body is cooled through an annealing schedule to avoid cracking and the buildup of internal stresses therein. The minimum firing temperature is dependent upon the ease of formation of the glass and entrapment of the gas. The maximum firing temperature is governed by the resistance to distortion of the fired body and the support plates. In general, a firing time of at least two minutes is required at the cellulating temperatures even with very thin bodies. Thick walled articles will, obviously, require longer firing times, perhaps up to two hours. Cooling the cellulated article to room temperature over a period of one hour is usually sufficient to yield a satisfactorily annealed body. However, very thick walled bodies may require somewhat longer.

The fired product demonstrates severy very useful properties. The size of the cells is generally less than 1 mm. and the size of the cells is very uniform throughout the body. The cells are generally spherical in shape and are commonly closed such that there are few, if any, interconnecting passages within the structure. The bulk density is less than 0.5 gram/cc. (31.2 lbs./ft.$^3$), the coefficient of expansion (25°–300°C.) is less than 50 ×10$^{-7}$/°C., and the modulus of rupture normally exceeds 200 psi. X-ray diffraction analysis have indicated the annealed body to be essentially free from crystals. This freedom from devitrification is also verified by the linearity of the thermal expansion plot. This feature is in contrast to the articles produced in U.S. Pat. No. 3,666,506, supra, wherein crystals of alpha-quartz, cristobalite, and/or plagioclase feldspar are found. The absence of crystals makes for a lower and generally more uniform coefficient of thermal expansion within the body. The formation of cristobalite is particularly deleterious since the high expansion thereof causes internal stresses which reduce strength and thermal shock resistance. The gas content of the cells was analyzed to consist principally of $CO_2$, $CO$, and $H_2O$.

In the following specific working examples, the batches were compounded and thereafter shaped, cellulated, and annealed following the general process parameters outlined above.

EXAMPLE I

A batch was prepared from the following ingredients:

a. 84.4 pounds of air floated Gonzales bentonite clay, having as its principal clay mineral montmorillonite with an approximate oxide composition, in weight percent, of 77 percent $SiO_2$, 16 percent $Al_2O_3$, 0.8 percent $Na_2O$, 0.5 percent $K_2O$, 1.3 percent CaO, 3 percent MgO, and 1.4 percent $Fe_2O_3$. The clay also contained about 10 percent adsorbed water and 6 percent water of hydration;
b. 10.8 pounds of anhydrous $B_2O_3$;
c. 3.8 pounds of caustic KOH; and
d. 1 pound of anhydrous sodium acetate. The composition of the overall batch, as calculated on the oxide basis in weight percent, was 63.5 percent $SiO_2$, 13.8 percent $Al_2O_3$, 12.4 percent $B_2O_3$, 1.6 percent $Na_2O$, 4.2 percent $K_2O$, 2.5 percent MgO, 1.3 percent CaO, and 0.7 percent $Fe_2O_3$.

The ingredients were blended together and then ball-milled for two hours to secure uniform intimate mixing and grain sizing. A screen analysis demonstrated that all the material passed a standard United States 200 mesh screen and more than 25 percent thereof was finer than 5 microns. About six pounds of water was added thereto, through spraying, to yield some granulation.

A tunnel kiln was employed for firing which had a moving 6 foot wide stainless steel belt running therethrough. A thin (0.025 inch) sheet of asbestos paper perforated with 1/32 inch diameter holes on ¼ inch centers was placed on the belt as protection from the foam. The batch was spread over the asbestos paper in an even layer 27 inch wide and 3/8 inch deep and then passed through the kiln which was operating according to the following schedule:

Kiln entrance at 400°C.
Temperature raised to 950°C. in 20 minutes
Held at 950°C. for 10 minutes
Temperature reduced to 650°C. in 35 minutes
Temperature reduced to 520°C. in 55 minutes (annealing step)
Temperature reduced to exit temperature of 100°C. in 30 minutes
Total time in kiln — 150 minutes The resultant fired foam glass was annealed and an even 1 ½inch thick. The bulk density thereof was about 0.42 gram/cc., and the coefficient of thermal expansion (25°–300°C.) 46 ×10$^{-7}$/°C. No crystallization within the structure was observed through X-ray diffraction analysis and no deviations from the linear were observed in the plot of thermal expansion. A chemical analysis of the foam indicated 11.85 percent $B_2O_3$, thereby demonstrating the essentially complete retention of $B_2O_3$ from the batch. The average modulus of rupture was about 240 psi and the thermal conductivity was 0.59 BTU in h$^{-1}$ft$^{-2°}$ F.$^{-1}$. This latter very low value is believed to be due, at least in part, to the very fine uniform pore size of the body.

When a second batch was compounded, mixed together, and fired in accordance with the above-outlined procedure, the resultant physical properties were essentially identical, indicating good reproducibility.

Example II is illustrative of the great care which must be exercised in composition control, particularly with respect to alkali metal oxide content.

EXAMPLE II

Two batches were prepared from the following ingredients:

a. 84.4 pounds of the Gonzales bentonite clay of Example I
b. 3.8 pounds caustic KOH
c. 1.8 pounds caustic NaOH
d. 1.0 pounds anhydrous sodium acetate
e. 10.8 pounds anhydrous $B_2O_3$ The composition of the overall batches, as calculated on the oxide basis in weight percent, was 63.7 percent $SiO_2$, 13.9 percent $Al_2O_3$, 12.4 percent $B_2O_3$, 3.1 percent $Na_2O$, 2.4 percent $K_2O$, 2.5 percent MgO, 1.3 percent CaO, and 0.7 percent $Fe_2O_3$.

The batches were treated and fired in the same manner as that described in Example I. The bulk density of the fired first batch measured about 0.45 grams/cc. and that of the second about 0.47 grams/cc. The plot of thermal expansion for each body demonstrated deviations from the linear, thereby indicating that devitrification had occurred. X-ray diffraction analyses confirmed the presence of cristobalite crystals in each. The average coefficient of thermal expansion (25°–300°C.) for the foamed first batch was determined to be about 50 × 10$^{-7}$/°C. whereas that of the second was somewhat higher at 53 × 10$^{-7}$/°C.

A comparison of these findings with the measurements secured on the products of Example I clearly support at least three conclusions. First, the preferred compositions will be free from $Na_2O$. Second, Example II approaches the 60 percent $K_2O$–40 percent $Na_2O$ flux limitation but the foamed product is truly not acceptable nor are the properties developed therein reproducible. Three, the presence of devitrification cannot be controlled when $Na_2O$ constitutes a substantial proportion of the flux, thus leading to variations in thermal expansion within the foamed body.

These examples are believed to underscore the foaming capabilities demonstrated by the products of this invention as well as the exceptionally useful physical properties exhibited thereby. Thus, the foam glasses of the invention can be made continuously in long slabs or in complex geometries which will display good strength, low thermal expansion, and low thermal conductivity. However, careful composition control is demanded to achieve the desired properties.

I claim:

1. A batch consisting of particles substantially all passing a standard United States 200 mesh screen and at least 10 percent thereof being finer than 5 microns in diameter useful for making a cellulated glass body consisting essentially, on an anhydrous basis, of rock, a cellulating agent, a flux, and a $B_2O_3$-containing material wherein:
   a. said rock comprises at least 50 percent by weight of the total batch and is selected from the group consisting of volcanic ash, weathered volcanic ash, clay, and mixtures thereof;
   b. said cellulating agent comprises about 0.1–2 percent carbon and is selected from the group consisting of carbon, an organic compound which thermally decomposes to yield carbon at a temperature below the celluating temperature, and mixtures thereof;
   c. said flux consists of about 3–10 percent alkali metal oxide wherein at least about 60 percent by weight thereof is $K_2O$; and
   d. said $B_2O_3$-containing material is included in the necessary amount to produce 7–18 percent $B_2O_3$; said batch consisting essentially, calculated by weight on the oxide basis (exclusive of said cellulating agent), of about 3–10 percent alkali metal oxide, 7–18 percent $B_2O_3$, 10–20 percent $Al_2O_3$, and 50–80 percent $SiO_2$, wherein $SiO_2:Al_2O_3$ ranges between about 3:1–7:1, the total of alkali metal oxide, $B_2O_3$, $Al_2O_3$, and $SiO_2$ constituting at least 90 percent by weight of the batch.

2. A batch according to claim 1 wherein said clay contains, as a principal component, at least one mineral from the illite and/or smectite groups.

3. A batch according to claim 2 wherein said mineral is montmorillonite from the smectite group.

4. A batch according to claim 3 wherein bentonite clay provides said montmorillonite mineral.

5. A batch according to claim 1 wherein up to 25 percent by weight thereof consists of grog.

6. An integral glassy body essentially free from devitrification produced by cellulating the batch of claim 1 and exhibiting:
   a. a density less than about 0.5 grams/cc.;
   b. a modulus of rupture in excess of about 200 psi;
   c. an essentially uniform, closed cell structure wherein the cells are generally spherical in shape and do not exceed about 1 mm. in diameter; and
   d. a coefficient of thermal expansion less than about $50 \times 10^{-7}/°c$.

7. A method for producing a cellulated glass body essentially free from devitrification and having a density less than about 0.5 grams/cc. which comprises the steps of:
   a. preparing a batch consisting of particles substantially all passing a standard United States 200 mesh screen and at least 10 percent thereof being finer than 5 microns in diameter consisting essentially, on an anhydrous basis, of rock, a cellulating agent, a flux, and a $B_2O_3$-containing material wherein:
      1. said rock comprises at least 50 percent by weight of the total batch and is selected from the group consisting of volcanic ash, weathered volcanic ash, clay, and mixtures thereof;
      2. said cellulating agent comprises about 0.1–2 percent carbon and is selected from the group consisting of carbon, an organic compound which thermally decomposes to yield carbon at a temperature below the cellulating temperature, and mixtures thereof;
      3. said flux consists of about 3–10 percent alkali metal oxide wherein at least about 60 percent thereof is $K_2O$; and
      4. said $B_2O_3$-containing material is included in the necessary amount to produce 7–18 percent $B_2O_3$;

said batch consisting essentially, calculated by weight on the oxide basis (exclusive of said cellulating agent), of about 3–10 percent alkali metal oxide, 7–18 percent $B_2O_3$, 10–20 percent $Al_2O_3$, and 50–80 percent $SiO_2$, wherein $SiO_2: Al_2O_3$ ranges between about 3:1–7:1, the total of alkali metal oxide, $B_2O_3$, $Al_2O_3$, and $SiO_2$ constituting at least 90 percent by weight of the batch;

b. shaping said batch to form an article of a desired configuration;
   c. firing the shaped body at a temperature between about 875°–1,000°C. for a sufficient length of time to produce a cellulated body having a density less than about 0.5 grams/cc.; and then
   d. annealing the body to room temperature.

8. A method according to claim 7 wherein said clay contains, as a principal component, at least one mineral from the illite and/or smectite group.

9. A method according to claim 8 wherein said mineral is montmorillonite from the smectite group.

10. A method according to claim 7 wherein said time for firing at the cellulating temperature ranges between about 2 minutes to 2 hours.

* * * * *

UNITED STATES PATENT OFFICE
CERTIFICATE OF CORRECTION

Patent No. 3,793,039              Dated February 19, 1974

Inventor(s)  David Rostoker

It is certified that error appears in the above-identified patent and that said Letters Patent are hereby corrected as shown below:

Column 2, line 17, "throuth" should be -- through --.

Column 3, line 49, delete second "oxide".

Column 4, line 65, "severy" should be -- several --.

Column 8, Claim 7, line 25, before "thereof" insert -- by weight --.

Signed and sealed this 17th day of September 1974.

(SEAL)
Attest:

McCOY M. GIBSON JR.
Attesting Officer

C. MARSHALL DANN
Commissioner of Patents